United States Patent
Takeuchi (10) Patent No.: US 9,325,885 B2
(45) Date of Patent: Apr. 26, 2016

(54) IMAGE STABILIZATION APPARATUS AND CONTROL METHOD THEREFOR

(71) Applicant: CANON KABUSHIKI KAISHA, Tokyo (JP)

(72) Inventor: Kenji Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 14/048,725

(22) Filed: Oct. 8, 2013

(65) Prior Publication Data

US 2014/0125828 A1   May 8, 2014

(30) Foreign Application Priority Data

Nov. 6, 2012   (JP) .................................. 2012-244809

(51) Int. Cl.
*H04N 5/225* (2006.01)
*H04N 5/232* (2006.01)

(52) U.S. Cl.
CPC ......... *H04N 5/2254* (2013.01); *H04N 5/23258* (2013.01); *H04N 5/23287* (2013.01)

(58) Field of Classification Search
CPC .......... H04N 5/23232; H04N 5/23222; H04N 5/23258; H04N 5/23287; H04N 5/23293; H04N 5/2254
See application file for complete search history.

(56) References Cited

U.S. PATENT DOCUMENTS

| | | | | |
|---|---|---|---|---|
| 5,831,671 A | * | 11/1998 | Chigira et al. | 348/208.8 |
| 5,918,077 A | * | 6/1999 | Wakabayashi et al. | 396/55 |
| 6,359,648 B1 | * | 3/2002 | Fukasaka | 348/208.99 |
| 6,630,950 B1 | * | 10/2003 | Ohkawara et al. | 348/208.12 |
| 6,650,361 B1 | * | 11/2003 | Shiomi | 348/218.1 |
| 2002/0097324 A1 | * | 7/2002 | Onuki | 348/208 |
| 2002/0126210 A1 | * | 9/2002 | Shinohara et al. | 348/219 |
| 2002/0163581 A1 | * | 11/2002 | Kitazawa et al. | 348/208.6 |
| 2011/0254985 A1 | * | 10/2011 | Hiramoto et al. | 348/294 |

FOREIGN PATENT DOCUMENTS

| | | | |
|---|---|---|---|
| JP | 07-287268 A | 10/1995 | |
| JP | 10-191135 A | 7/1998 | |

* cited by examiner

*Primary Examiner* — Roberto Velez
*Assistant Examiner* — Tuan Le
(74) *Attorney, Agent, or Firm* — Cowan, Liebowitz & Latman, P.C.

(57) ABSTRACT

An image stabilization apparatus mounted on an image capturing apparatus, comprises a correction member capable of changing a position of an image on an image sensing plane by moving in a direction perpendicular to an optical axis, a position detection unit configured to detect a position of the correction member, a control unit configured to control driving of the correction member so as to have an amplitude larger than a pixel pitch of an image sensor, and an exposure control unit configured to control exposure of the image sensor, wherein the exposure control unit performs the exposure when the position of the correction member detected by the position detection unit moves by the pixel pitch.

6 Claims, 10 Drawing Sheets

IMAGE STABILIZATION APPARATUS AND CONTROL METHOD THEREFOR

BACKGROUND OF THE INVENTION

1. Field of the Invention

The present invention relates to a technique of correcting an image blur due to a shake of an image capturing apparatus.

2. Description of the Related Art

Conventionally, an image stabilization function detects a shake of an apparatus, and moves an image stabilization member (an image stabilization lens and a holding member therefor), which is movable to correct an image blur due to the detected shake, in a direction to cancel a shake amount.

On the other hand, there has been conventionally proposed an image capturing apparatus which uses a so-called pixel shifting technique. In this technique, a plurality of sets of image signals are obtained by performing shooting a plurality of times while slightly changing the relative position between an object image formed by an imaging optical system and an image sensor for photoelectrically converting the object image, and are combined by a predetermined method, thereby obtaining a high-resolution image. For example, the following related art literatures for the pixel shifting technique are well known.

In Japanese Patent Laid-Open No. 7-287268, a variable angle prism in front of an imaging optical system is driven based on an image blur signal and pixel shifting signal to parallelly decenter an optical image on an image sensor, thereby cancelling an image blur by image stabilization and obtaining a high-resolution image by pixel shifting at the same time. This literature also discloses to prohibit pixel shifting control when the focal length of the imaging optical system is equal to or larger than a predetermined value.

In addition, Japanese Patent Laid-Open No. 10-191135 discloses a technique of changing an operation of, for example, changing the number of times pixel shifting is performed, in accordance with the setting state of an exposure control condition setting unit for deciding, as an image capturing condition, the combination of an f-number and exposure time.

The methods described in Japanese Patent Laid-Open Nos. 7-287268 and 10-191135 have a high driving accuracy of an image stabilization member for pixel shifting under a specific ideal condition, and are proven to be effective. The specific ideal condition indicates that no large shake acts on an image capturing apparatus and thus no acceleration disturbance is caused, or that the influence such as static friction is very small in driving of the image stabilization member and thus the tracking accuracy of the image stabilization member for a pixel shifting command is high.

In fact, however, there is static friction to some extent at the driving unit of the image stabilization member. Since a command position for pixel shifting is driven by a small amount such as 1 or 0.5 pixel of the image sensor, it is readily influenced by friction, and thus it is difficult to perform pixel shifting by a correct distance. To solve this problem, it is necessary to attain a mechanical driving characteristic of the image stabilization member which receives little influence of friction and has a high driving accuracy so as to cope with driving of pixel shifting, which may increase the cost.

Furthermore, if a step command signal is sent to the image stabilization member for pixel shifting, an overshoot or deviation in tracking position of the image stabilization member may occur. In this case, a delay occurs until the target position (1 or 0.5 pixel) of pixel shifting is reached, thereby delaying exposure processing.

SUMMARY OF THE INVENTION

The present invention has been made in consideration of the above problems, and allows, when performing pixel shifting using an image stabilization member, high accuracy pixel shifting without delaying exposure processing.

According to the first aspect of the present invention, there is provided an image stabilization apparatus mounted on an image capturing apparatus, comprising: a correction member capable of changing a position of an image on an image sensing plane by moving in a direction perpendicular to an optical axis; a position detection unit configured to detect a position of the correction member; a control unit configured to control driving of the correction member so as to have an amplitude larger than a pixel pitch of an image sensor; and an exposure control unit configured to control exposure of the image sensor, wherein the exposure control unit performs the exposure when the position of the correction member detected by the position detection unit moves by the pixel pitch.

According to the second aspect of the present invention, there is provided a control method for an image stabilization apparatus which is mounted on an image capturing apparatus, and includes a correction member capable of changing a position of an image on an image sensing plane by moving in a direction perpendicular to an optical axis, the method comprising: a position detection step of detecting a position of the correction member; a control step of controlling driving of the correction member so as to have an amplitude larger than a pixel pitch of an image sensor; and an exposure control step of controlling exposure of the image sensor, wherein in the exposure control step, the exposure is performed when the position of the correction member detected in the position detection step moves by the pixel pitch.

Further features of the present invention will become apparent from the following description of exemplary embodiments with reference to the attached drawings.

DESCRIPTION OF THE EMBODIMENTS

An embodiment of the present invention will be described in detail below with reference to the accompanying drawings.

Figure 1:
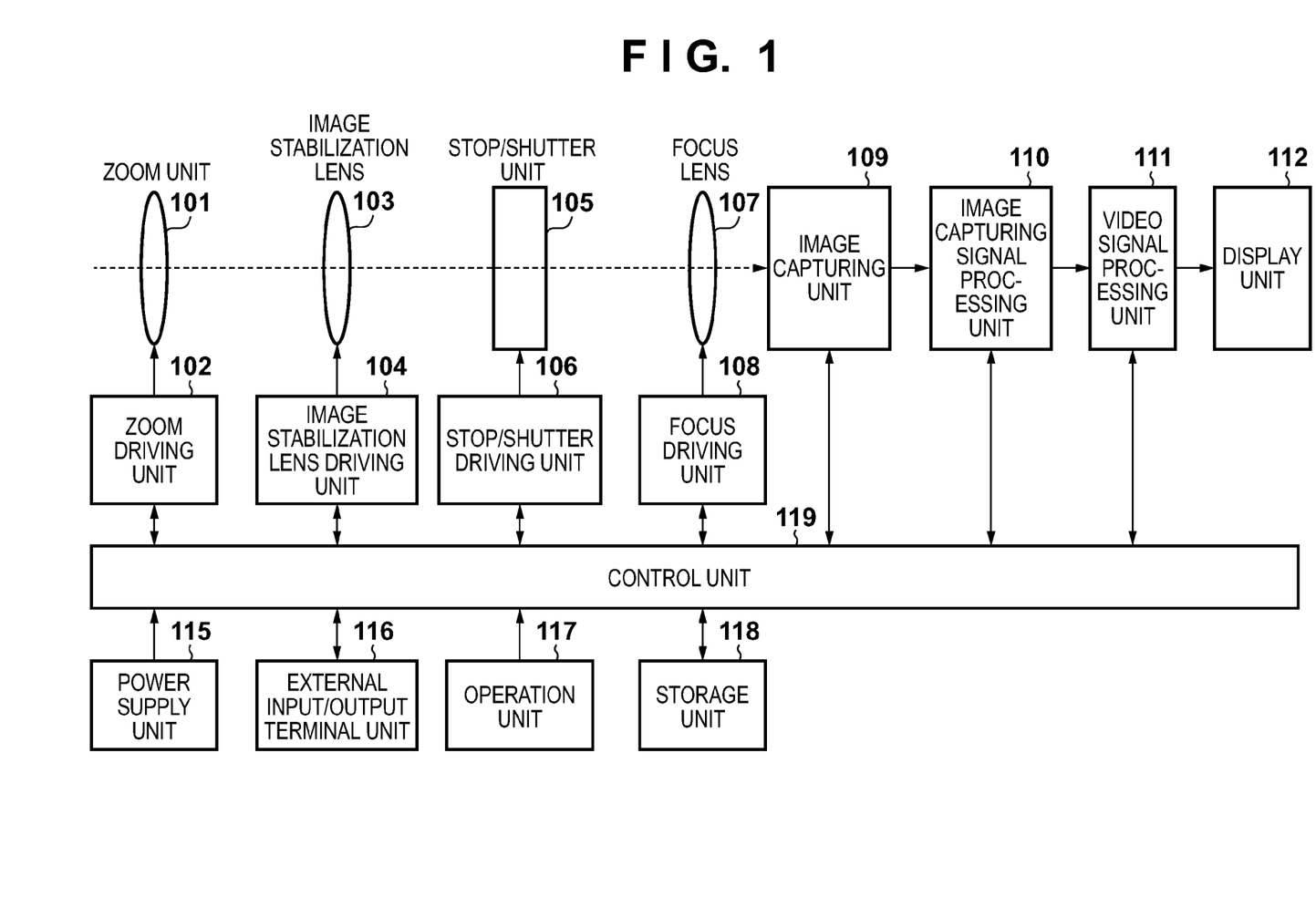
FIG. 1 is a block diagram showing an example of the functional arrangement of an image capturing apparatus according to an embodiment of the present invention.

FIG. 1 is a block diagram showing an example of the functional arrangement of an image capturing apparatus according to the embodiment of the present invention. In this embodiment, the image capturing apparatus is a digital still camera, which may have a moving image shooting function. Note that in the embodiment of the present invention, "pixel shifting" indicates obtaining a high-resolution image by obtaining a plurality of sets of image signals by performing shooting a plurality of times while slightly changing the relative position with respect to an image sensor for photoelectrically converting an object image, and combining the plurality of sets of image signals by a predetermined method. Assume that "pixel shifting" especially indicates a method of controlling an image stabilization member (an image stabilization lens and the like) for performing shooting a plurality of times while slightly changing the relative position with respect to the image sensor for photoelectrically converting an object image.

A zoom unit 101 is part of a variable-magnification photographing lens which forms an imaging optical system. The zoom unit 101 includes a zoom lens for changing the photographing lens magnification. A zoom driving unit 102 drives the zoom unit 101 under the control of a control unit 119. An image stabilization lens 103 serving as an image stabilization member is movable in a direction perpendicular to the optical axis of the photographing lens. An image stabilization lens driving unit 104 controls driving of the image stabilization lens 103.

A stop/shutter unit 105 is a mechanical shutter having the stop function. A stop/shutter driving unit 106 drives the stop/shutter unit 105 under the control of the control unit 119. A focus lens 107 is part of the photographing lens, and can change its position along the optical axis of the photographing lens. A focus driving unit 108 drives the focus lens 107 under the control of the control unit 119.

An image capturing unit 109 converts an optical image formed via the photographing lens into an electrical signal of each pixel using an image sensor such as a CCD image sensor or CMOS image sensor. An image capturing signal processing unit 110 performs A/D conversion, correlated double sampling, gamma correction, white balance correction, color interpolation processing, and the like for the electrical signal output from the image capturing unit 109, and converts the electrical signal into a video signal. A video signal processing unit 111 processes the video signal output from the image capturing signal processing unit 110 in accordance with an application purpose. More specifically, the video signal processing unit 111 generates a display video, and performs encoding processing and data file processing for recording.

A display unit 112 displays an image based on the display video signal output from the video signal processing unit 111, as needed. A power supply unit 115 supplies power to the entire image capturing apparatus in accordance with an application purpose. An external input/output terminal unit 116 receives/outputs communication signals and video signals from/to an external apparatus. An operation unit 117 includes buttons and switches used by the user to input instructions to the image capturing apparatus. A storage unit 118 stores various data such as video information. The control unit 119 includes, for example, a CPU, ROM, and RAM. The control unit 119 controls the respective units of the image capturing apparatus by expanding, in the RAM, a control program stored in the ROM and executing it by the CPU, thereby implementing operations of the image capturing apparatus including various operations to be described below.

The operation unit 117 includes a release button configured to sequentially turn on a first switch (SW1) and a second switch (SW2) in accordance with press amounts. The release switch SW1 is turned on when the release button is pressed about halfway, and the release switch SW2 is turned on when it is pressed fully.

When the release switch SW1 is turned on, the control unit 119 performs, for example, auto focus detection by controlling the focus driving unit 108 based on an AF evaluation value based on a display video signal output from the video signal processing unit 111 to the display unit 112. Furthermore, the control unit 119 performs AE processing to decide an f-number and shutter speed for obtaining an appropriate exposure amount based on luminance information of the video signal and, for example, a predetermined program chart. When the release switch SW2 is turned on, the control unit 119 controls the respective units to perform shooting at the determined f-number and shutter speed and store image data obtained by the image capturing unit 109 in the storage unit 118.

The operation unit 117 includes a selection switch capable of selecting an image stabilization mode. When the user selects the image stabilization mode with the selection switch, the control unit 119 instructs the image stabilization lens driving unit 104 to perform an image stabilization operation. Upon receiving the instruction, the image stabilization lens driving unit 104 executes the image stabilization operation until it is instructed to turn off image stabilization. The operation unit 117 also includes a shooting mode selection switch capable of selecting either a still image shooting mode or moving image shooting mode. In each shooting mode, the operation condition of the image stabilization lens driving unit 104 can be changed.

Moreover, the operation unit 117 includes a pixel shifting setting switch for setting whether to perform pixel shifting on the image sensing plane of the image sensor. A pixel shifting setting unit 211 (see FIG. 2) is notified of the setting. The operation unit 117 also includes a playback mode selection switch for selecting a playback mode. In the playback mode, the image stabilization operation stops.

The operation unit 117 includes a magnification change switch for inputting a zoom magnification change instruction. If a zoom magnification change instruction is input with the magnification change switch, the zoom driving unit 102 receives the instruction via the control unit 119, and drives the zoom unit 101 to move to an instructed zoom position.

(Arrangement of Image Stabilization Lens Driving Unit 104)

Figure 2:
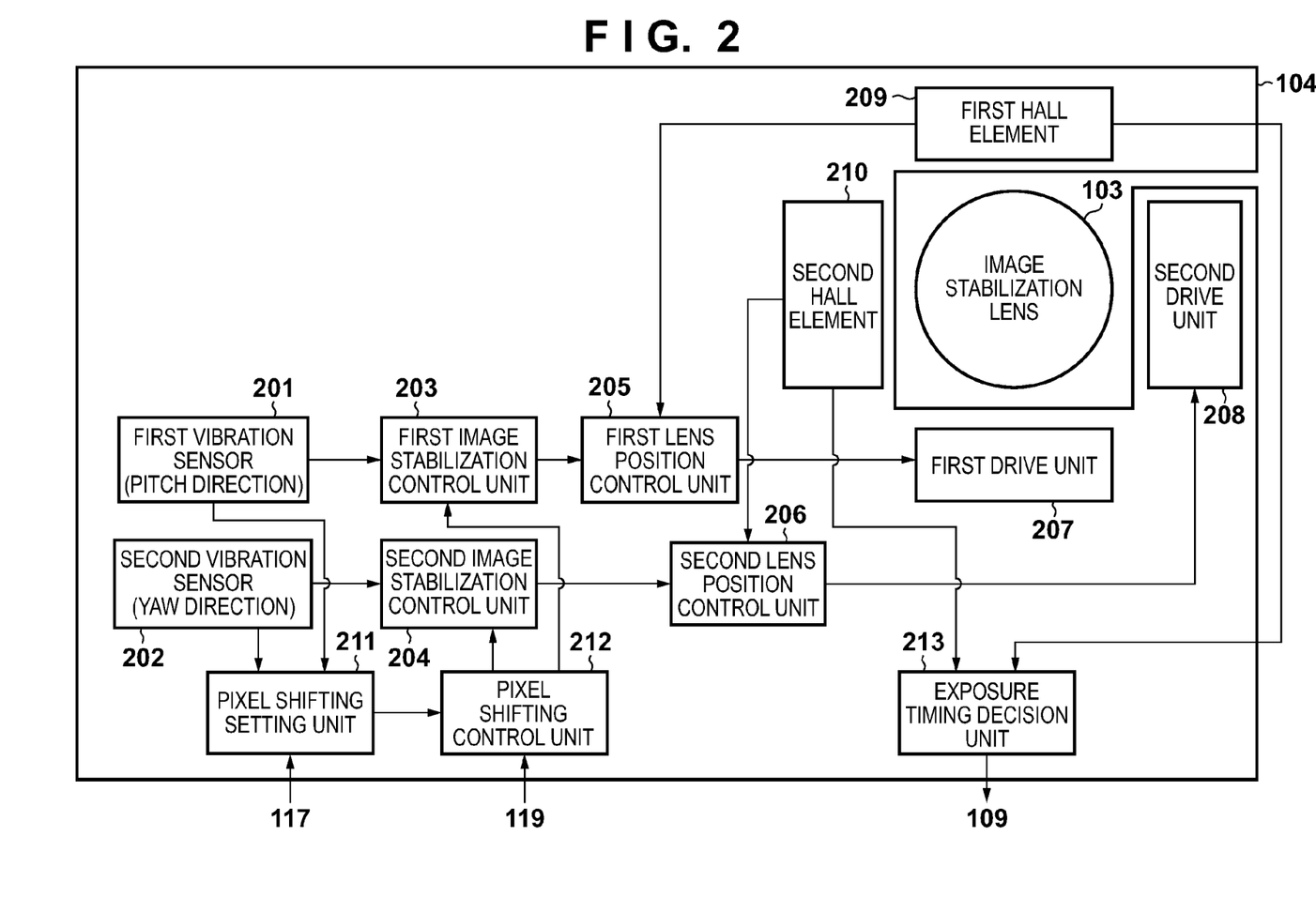
FIG. 2 is a block diagram showing an example of the arrangement of an image stabilization driving unit shown in FIG. 1.

FIG. 2 is a block diagram showing an example of the functional arrangement of the image stabilization lens driving unit 104.

A first vibration sensor 201 is, for example, an angular velocity sensor, and detects vibrations in the vertical direction (pitch direction) of the image capturing apparatus in a normal orientation (orientation in which the longitudinal direction of an image almost coincides with the horizontal direction). A second vibration sensor 202 is, for example, an angular velocity sensor, and detects vibrations in the horizontal direction (yaw direction) of the image capturing apparatus in a normal orientation. That is, the first vibration sensor 201 and second vibration sensor 202 respectively detect vibrations in directions perpendicular to each other and perpendicular to the optical axis. First and second image stabilization control units 203 and 204 respectively output image stabilization lens correction position control signals in the pitch and yaw directions, and control driving of the image stabilization lens.

A first lens position control unit 205 drives a first drive unit 207 by feedback control in accordance with the correction position control signal in the pitch direction from the first image stabilization control unit 203, and position information of the image stabilization lens 103 in the pitch direction from a first Hall element 209. Similarly, a second lens position control unit 206 drives a second drive unit 208 by feedback control in accordance with the correction position control signal in the yaw direction from the second image stabilization control unit 204, and position information of the image stabilization lens in the yaw direction from a second Hall element 210.

When the user sets to perform pixel shifting using the operation unit 117 or when the first and second vibration sensors 201 and 202 determine that no vibration acts on the image capturing apparatus (for example, when using a tripod), the pixel shifting setting unit 211 sends a pixel shifting driving command to a pixel shifting control unit 212. The pixel shifting control unit 212 generates a driving command for pixel shifting to be sent to the image stabilization lens 103 in accordance with a shooting condition obtained via the control unit 119, and sends the command to the first and second image stabilization control units 203 and 204. An exposure timing decision unit 213 generates an exposure timing signal based on the pieces of image stabilization lens position information obtained from the first and second Hall elements 209 and 210, and sends the generated signal to the image capturing unit 109.

Note that the driving directions of the drive units are not necessarily limited to the pitch and yaw directions. For example, to detect shakes in the pitch and yaw directions, the correction axis directions may be tilted at a predetermined angle (for example, 45°). Even if there are three or more actuators, it is only necessary to calculate correction amounts corresponding to shakes in the pitch and yaw directions. If the optical path of the imaging optical system is bent, the shake detection direction does not always coincide with the correction axis direction, and thus it is necessary to perform consistent correction before and after the bend of the optical path.

(Operation of Image Stabilization Lens Driving Unit 104)

The driving control operation of the image stabilization lens 103 by the image stabilization driving unit 104 shown in FIG. 2 will be described.

The first and second image stabilization control units 203 and 204 receive, from the first and second vibration sensors 201 and 202, shake signals (angular velocity signals) representing shakes of the image capturing apparatus in the pitch and yaw directions, respectively. Based on the shake signals, the first and second image stabilization control units 203 and 204 generate correction position control signals for driving the image stabilization lens 103 in the pitch and yaw directions, and output them to the first and second position control units 205 and 206, respectively.

The first and second Hall elements 209 and 210 (position detection units) output, as pieces of position information in the pitch and yaw directions of the image stabilization lens 103, signals having voltages corresponding to the strengths of magnetic fields generated by magnets provided in the image stabilization lens 103, respectively. The pieces of position information are supplied to the first and second lens position control units 205 and 206 and the exposure timing decision unit 213. The first and second lens position control units 205 and 206 perform feedback control while driving the first and second driving units 207 and 208, so that signal values from the first and second Hall elements 209 and 210 converge to correction position control signal values from the first and second image stabilization control units 203 and 204, respectively.

Note that position signal values from the first and second Hall elements 209 and 210 vary. Thus, outputs from the first and second Hall elements 209 and 210 are adjusted to move the image stabilization lens 103 to a predetermined position according to predetermined correction position control signals. The position signal values output from the first and second Hall elements 209 and 210 are supplied to the exposure timing decision unit 213, which then generates an exposure timing and notifies the image capturing unit 109 of it a plurality of times for pixel shifting.

Based on pieces of shake information from the first and second vibration sensors 201 and 202, the first and second image stabilization control units 203 and 204 output correction position control signals to move the position of the image stabilization lens 103 so as to cancel an image blur, respectively. For example, the first and second image stabilization control units 203 and 204 can generate correction position control signals by performing filter processing or the like for the pieces of shake information (angular velocity signals), respectively. With the above operation, even if vibrations such as a shake act on the image capturing apparatus in shooting, an image blur can be prevented up to a certain degree of vibrations. Based on pieces of shake information from the first and second vibration sensors 201 and 202 and outputs from the first and second Hall elements 209 and 210, the first and second image stabilization control units 203 and 204 detect the panning state of the image capturing apparatus and perform panning control.

Furthermore, when the user sets pixel shifting using the operation unit 117 or when outputs from the first and second vibration sensors 201 and 202 are smaller than a predetermined value and no shake acts on the image capturing apparatus (for example, when using a tripod), the pixel shifting setting unit 211 automatically turns on the pixel shifting mode. The pixel shifting setting unit 211 then instructs the pixel shifting control unit 212 to turn on the pixel shifting mode. The pixel shifting control unit 212 generates an image stabilization lens driving command signal for pixel shifting according to the shooting condition obtained via the control unit 119, and sends it to the first and second image stabilization control units 203 and 204.

(Image Stabilization Mechanism)

Figure 3:
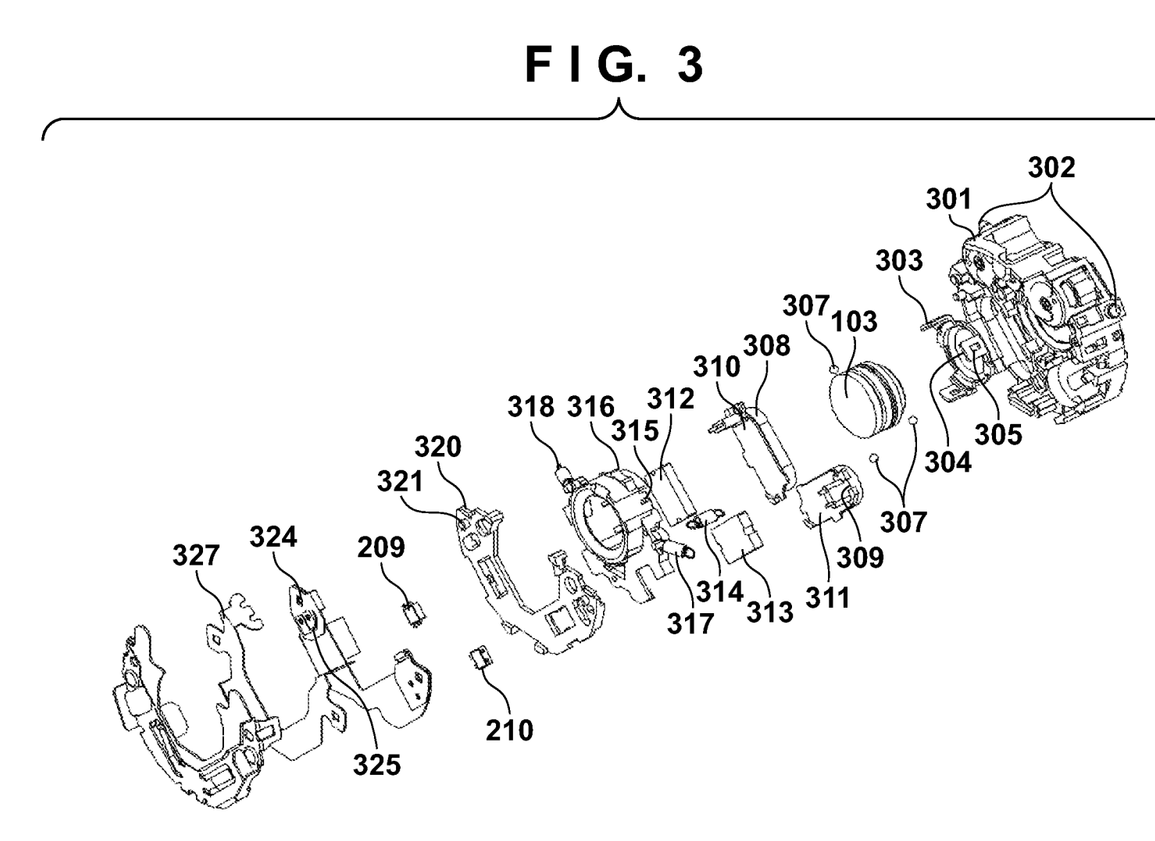
FIG. 3 is an exploded perspective view showing an example of the arrangement of an image stabilization mechanism according to the embodiment.

FIG. 3 is an exploded perspective view showing an example of the detailed arrangement of an image stabilization mechanism corresponding to the image stabilization lens 103, image stabilization driving unit 104, stop/shutter unit 105, and stop/shutter driving unit 106.

A base member 301 is the base of the image stabilization mechanism. The stop/shutter unit 105 and an ND filter mechanism are also fixed to the base member 301. Two follower pins 302 and a movable follower pin (not shown) are integrally formed on the base member 301. These three follower pins are fitted in three cam grooves of a cam cylinder (not shown) outside the base member 301 in the radial direction, and reciprocate along the cam grooves in the optical axis direction. A holder 316 holds the image stabilization lens 103 using a caulking claw (not shown).

A lens cover 303 has an opening which limits a beam passing through the image stabilization lens 103. Openings 305 are respectively formed in three arms 304 extending to the side surface. Projections 315 formed at three portions on the side surface of the holder 316 are fitted in the openings 305, integrally holding the lens cover 303 by the holder. The holder integrally holds magnets 312 and 313 mentioned above.

The holder 316 is pressed against the base member 301 via three balls 307, and can move in an arbitrary direction within a plane perpendicular to the optical axis as the balls 307 roll. The arrangement in which the balls 307 hold the holder 316 can generate high-frequency vibrations with a smaller amplitude than by an arrangement in which a guide bar guides a holder. Satisfactory correction can be performed even in an image capturing apparatus including an image sensor with many pixels.

One end of a thrust spring 314 is engaged with the projection 315 of the holder 316, and its the other end with a projection (not shown) of the base member 301. The thrust spring 314 is held stretched, and biases the holder 316 toward the base member 301. Radial springs 317 and 318 prevent rotation of the holder 316.

Metal pins are integrally formed at the distal ends of resin bobbins 310 and 311, and the ends of coils 308 and 309 are tied. On a flexible board (FPC) 324, a land 325 is electrically connected to the pins of the bobbins 310 and 311 by soldering or the like, and forms a circuit which supplies power to the coils 308 and 309.

The first and second Hall elements 209 and 210 are arranged near the magnets 312 and 313, and detect magnetic fields generated by the magnets 312 and 313. The first and second Hall elements 209 and 210 are mounted on the FPC 324, and receive power via the FPC 324.

An FPC 327 forms a circuit which supplies power to the stop/shutter unit 105 and an ND filter driving unit. The FPCs 324 and 327 are fixed to a holder 320 by a projection 321.

(Arrangement of Image Stabilization Control Unit)

Figure 4:
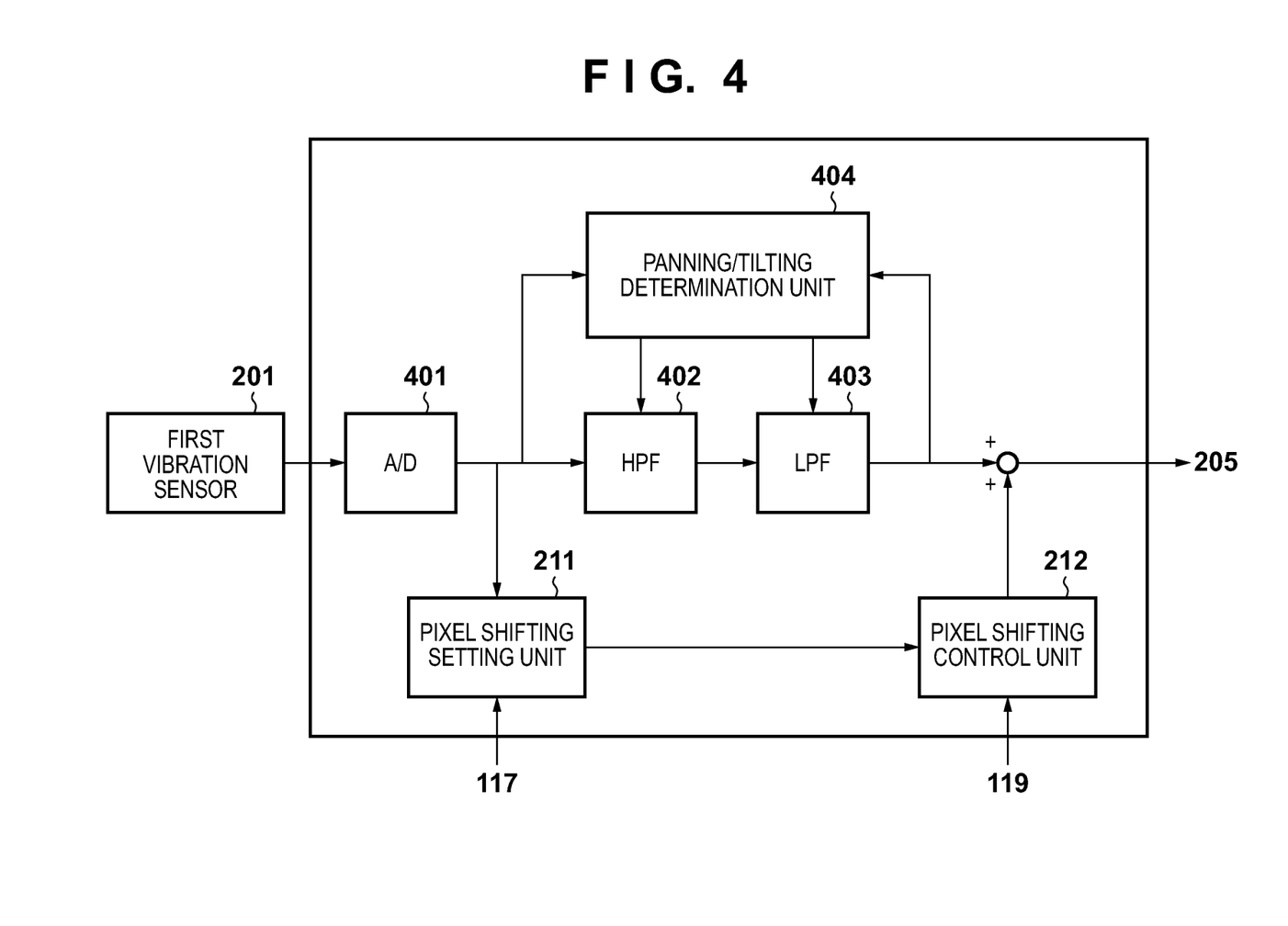
FIG. 4 is a block diagram showing the internal arrangement of an image stabilization control unit according to the embodiment.

FIG. 4 is a block diagram showing the internal arrangement of the first image stabilization control unit 203. The second image stabilization control unit 204 has the same internal arrangement as that of the first image stabilization control unit 203 and a description thereof will be omitted.

Referring to FIG. 4, an A/D converter 401 converts a shake information signal (angular velocity signal) from the first vibration sensor 201 into a digital signal. A high-pass filter (HPF) 402 can change its cutoff frequency to cut DC components. A low-pass filter (LPF) 403 is used to convert the angular velocity signal into an angle signal. A panning/tilting determination unit 404 detects a panning or tilting operation based on the angular velocity signal from the first vibration sensor 201 and information of the angle target value of the image stabilization lens output from the low-pass filter 403. The panning/tilting determination unit 404 then performs processing of, for example, changing the cutoff frequencies of the HPF 402 and LPF 403 so as to reduce the effect of image stabilization. For example, upon detecting a panning or tilting operation, the panning/tilting determination unit 404 increases the cutoff frequency of the HPF 402 to decrease the trackability of image stabilization, thereby reducing the effect of image stabilization. This processing reduces the effect of image stabilization for a user's intentional operation such as panning.

Based on information from the A/D converter 401 and operation unit 117, the pixel shifting setting unit 211 determines whether to perform pixel shifting, and notifies the pixel shifting control unit 212 of the determination result. As the setting method of the pixel shifting setting unit 211, for example, the user sets to perform pixel shifting by a physical switch operation. Or, the pixel shifting setting unit 211 may obtain an output from the first vibration sensor 201 within the image capturing apparatus after setting to perform pixel shifting, and automatically determine to turn on the pixel shifting mode when, for example, the output is equal to or smaller than a predetermined threshold during a predetermined time. The advantage of automatically determining the pixel shifting mode is that when no vibration acts on the image capturing apparatus, this state is optimum for pixel shifting, and the user can automatically shoot a high-resolution image with high accuracy with no regard to switching to the pixel shifting mode. The state in which no vibration acts on the image capturing apparatus may indicate a case in which an image is shot while the image capturing apparatus is attached to a tripod.

The pixel shifting control unit 212 generates an image stabilization lens command signal for pixel shifting using the shooting condition information obtained from the control unit 119, adds it to a command signal for image stabilization output from the LPF 403, and outputs the result to the first lens position control unit 205.

An image stabilization lens driving operation for a pixel shifting operation performed in the image capturing apparatus having the above-described arrangement will be described with reference to FIGS. 5A to 5C and 6A to 6E.

Figure 5A:
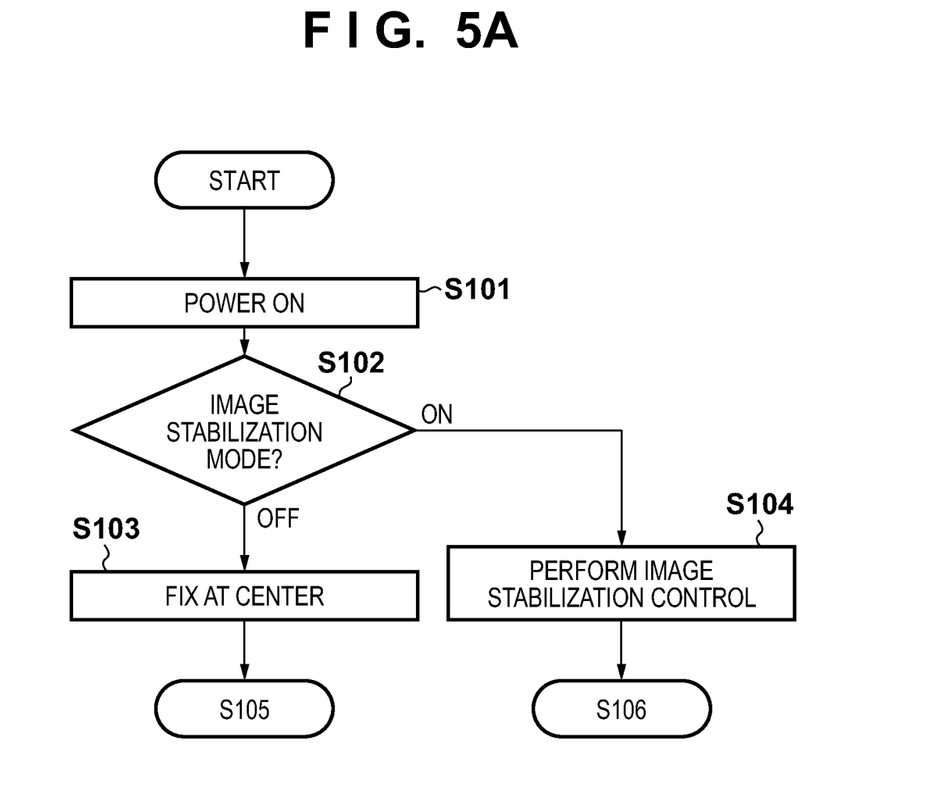
FIG. 5A is a flowchart illustrating a pixel shifting procedure according to the embodiment.
Figure 5B:
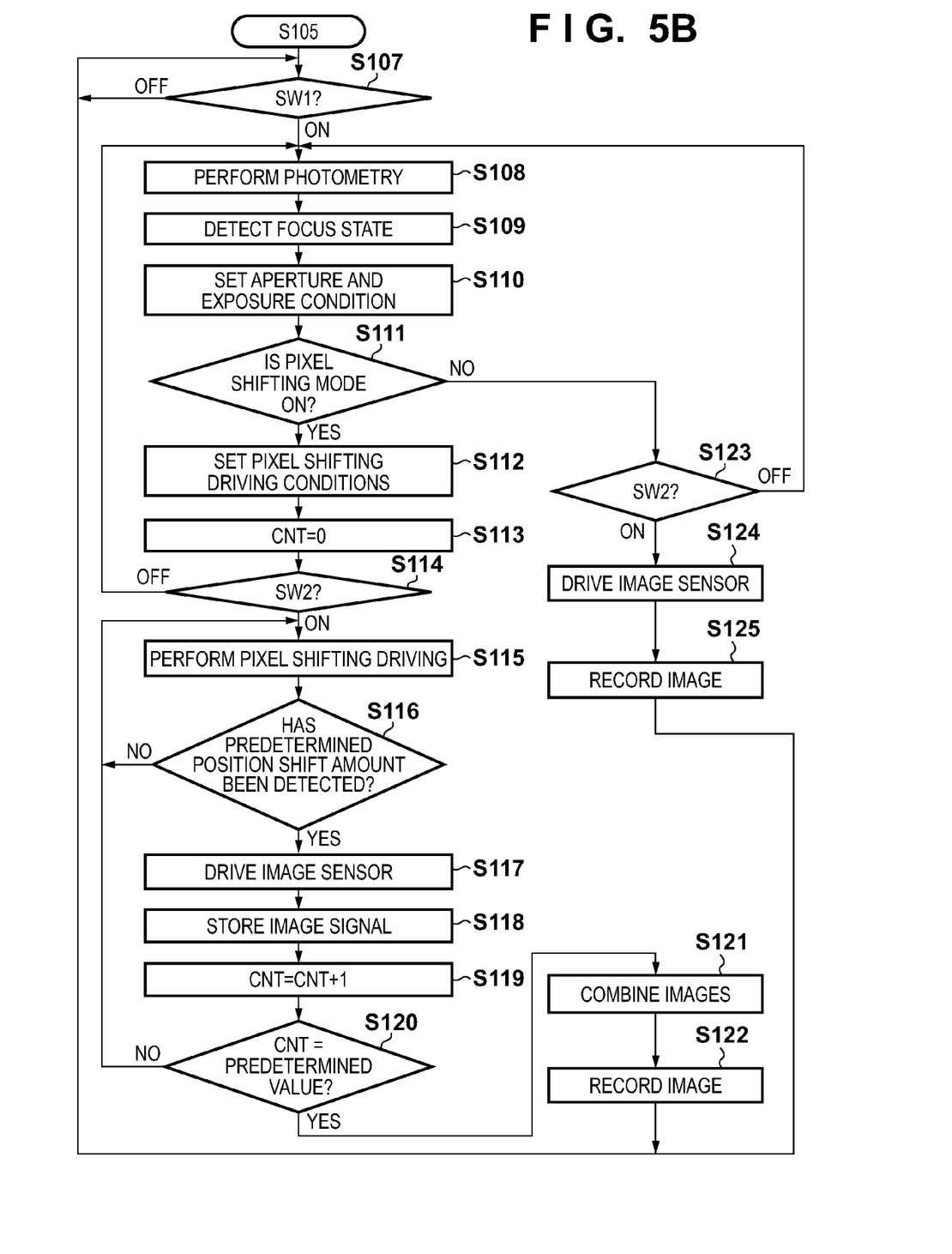
FIG. 5B is a flowchart illustrating the pixel shifting procedure according to the embodiment.
Figure 5C:
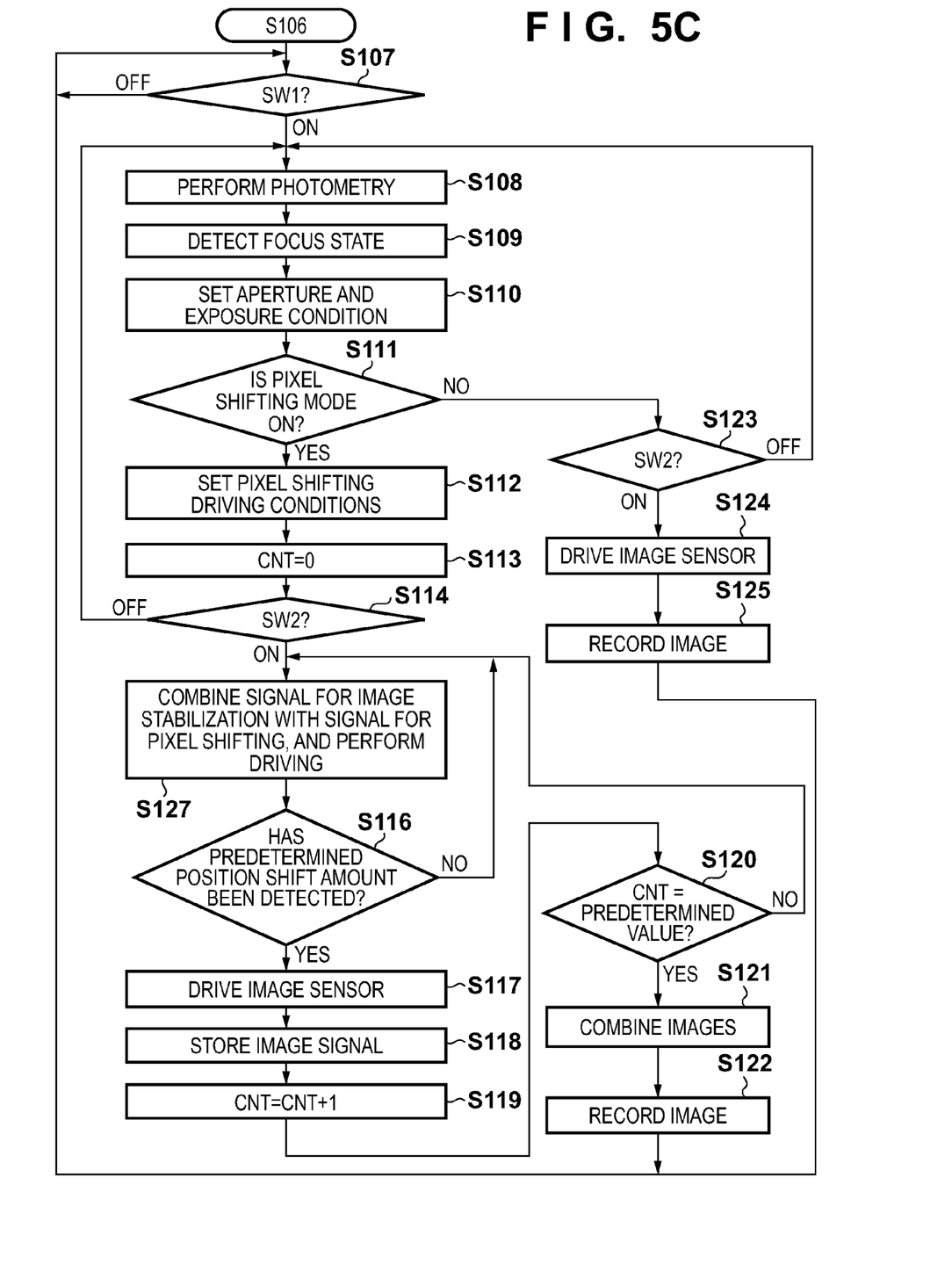
FIG. 5C is a flowchart illustrating the pixel shifting procedure according to the embodiment.

FIGS. 5A to 5C are flowcharts illustrating a pixel shifting driving procedure performed in the image capturing apparatus according to the embodiment. FIGS. 6A to 6E are views showing examples of pixel shifting driving command values according to the embodiment.

When the image capturing apparatus is powered on (step S101), it is determined whether the user has set the image stabilization mode to ON using the operation unit 117 (step S102). If, as a result, the image stabilization mode has been set to OFF, the process advances to step S103. In step S103, no image stabilization control is performed, and the image stabilization lens is fixed at the center position of the optical axis. The process then advances to step S105.

After advancing to step S105, in step S107, the state of the first switch SW1 of the shutter release button is detected. If the SW1 is OFF, the state detection is repeatedly performed until the SW1 is turned on. On the other hand, if the SW1 is turned on in step S107, the process advances to step S108. In step S108, the brightness of an object is measured. In step S109, a focus state is detected. In step S110, the image signal accumulation time and aperture control value of the image sensor are calculated based on a predetermined exposure control program chart.

In step S111, it is determined whether the pixel shifting mode has been set to ON by the pixel shifting setting unit 211. If the pixel shifting mode has been set to ON, conditions such as an image stabilization lens driving amplitude, frequency, and driving pattern for pixel shifting are set based on the image signal accumulation time and the like in step S112.

After initializing a counter CNT for a stored image signal count to 0 in step S113, the state of the release switch SW2 is detected in step S114. If the SW2 is OFF, the process returns to step S108 to make various settings, thereby repeatedly executing the operation until the SW2 is turned on. If the SW2 is turned on, pixel shifting driving starts in step S115 to move the image stabilization lens by a predetermined amount based on the driving conditions (to be described later with reference to FIGS. 6A to 6E) set in advance in step S112.

While executing the pixel shifting driving operation, it is detected in step S116 whether the position signal of the image stabilization lens has shifted by the predetermined value set in advance. If the position signal has not shifted by the predetermined value, the process returns to step S115 to continue the pixel shifting driving operation. If it is detected in step S116 that the position of the image stabilization lens has shifted by the predetermined value, the image sensor is driven in step S117, thereby accumulating charges in the image sensor, transferring the accumulated charges, and performing readout control.

In step S118, the image signal read out in step S117 is temporarily stored in the storage unit 118. In step S119, the image signal storage count counter CNT is incremented by one. In step S120, it is determined whether the counter CNT has reached a predetermined value. If the counter CNT has not reached the predetermined value, the process returns to step S115 to continue the pixel shifting control.

If it is determined in step S120 that the counter CNT has reached the predetermined value, the process advances to step S121. In step S121, a plurality of image signals obtained by pixel shifting are combined, thereby creating one high-resolution image. In step S122, the image created in step S121 is stored in a memory.

The shooting operation then ends and the process returns to step S105. If it is determined in step S107 that the switch SW1 is ON, the subsequent operations are repeated.

On the other hand, if it is determined in step S111 that the pixel shifting mode is not ON, the process advances to step S123. In step S123, it is detected whether the SW2 is ON. If the SW2 is OFF, the process returns to step S108 to continue the subsequent operations. If it is detected in step S123 that the SW2 is ON, no pixel shifting is performed and the image sensor is driven in step S124, thereby accumulating charges in the image sensor, transferring the accumulated charges, and performing readout control, as usual. In step S125, the image is recorded in the memory, and the shooting operation ends.

The pixel shifting operation procedure when the image stabilization mode is OFF has been explained.

On the other hand, if it is determined in step S102 that the image stabilization mode is ON, the process advances to step S104. In step S104, image stabilization control is performed based on pieces of image blur information from the vibration sensors 201 and 202, and the process advances to step S106. Operations in step S106 and subsequent steps are almost the same as those in step S105 and subsequent steps, and only different points will be described.

If it is determined in step S111 that the pixel shifting mode is ON and it is detected in step S114 that the switch SW2 is turned on, it is necessary to drive the image stabilization lens for pixel shifting simultaneously with driving of the image stabilization lens for image stabilization. To do this, in step S127, a signal output from the LPF 403 for image stabilization is added to a signal output from the pixel shifting control unit 212 for pixel shifting and the result is sent as an image stabilization lens target signal, as shown in FIG. 4. The above-described operation makes it possible to simultaneously execute both image stabilization and pixel shifting even if image stabilization is ON.

An image stabilization lens driving method for pixel shifting according to the embodiment will be described with reference to FIGS. 6A to 6E.

Figure 6A:
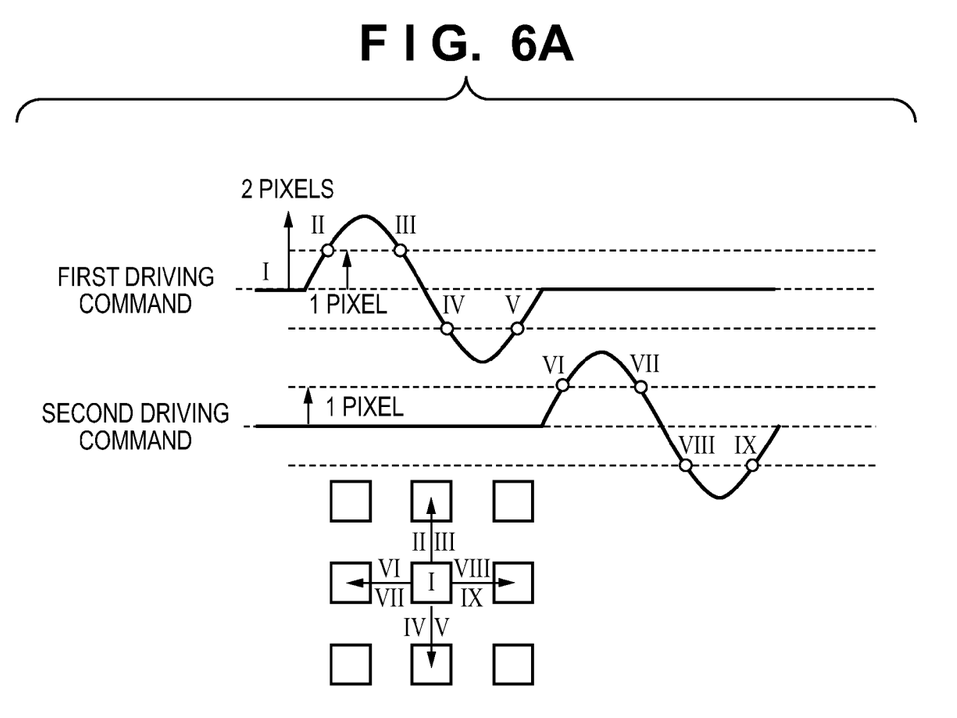
FIG. 6A is a view showing driving commands for pixel shifting according to the embodiment.

FIG. 6A shows the waveforms of first and second image stabilization lens driving command values for one pixel shifting and movement of an image with respect to a light-receiving element. When an image is at a position I, charge accumulation and readout of the light-receiving element are executed without performing pixel shifting. The first image stabilization control unit 203 outputs a driving command for pixel shifting without sending a driving command for pixel shifting from the second image stabilization control unit 204, thereby starting driving of the image stabilization lens. As the driving command, a sinusoidal wave of an amplitude corresponding to ±2 pixels is output, and the exposure timing decision unit 213 monitors an output from the first Hall element 209 being driven. If it is detected that the output from the first Hall element 209 has shifted by one pixel (pixel pitch) in the positive direction with respect to the position I, the exposure timing decision unit 213 instructs the image capturing unit 109 to start exposure, and charge accumulation and readout of the light-receiving element are executed at a position II. As the image stabilization lens moves, charge accumulation and readout of the light-receiving element are executed in the same manner at a sinusoidal driving position III, and positions IV and V in the negative direction.

After that, the second image stabilization control unit 204 sends a second pixel shifting driving command without sending a driving command for pixel shifting from the first image stabilization control unit 203. Similarly to positions II to V, charge accumulation and readout of the light-receiving element are executed at positions VI to A. Nine image data captured at the positions I to IX are then combined, thereby creating a high-resolution image.

In this embodiment, data at positions with the same shift amount like the positions II and III are obtained and combined for the sinusoidal wave. This is done for averaging variations in pixel shift amount and the like using the image data with the same pixel shift amount, thereby accommodating variations. However, only one of these data with the same pixel shift amount may be used. As described above, by sinusoidally performing driving for pixel shifting by increasing the pixel shift amount from one pixel, which is actually desired, to two pixels, statistic friction in microdriving can change to dynamic friction, and thus it is possible to reduce a position shift of pixel shifting and a driving delay due to the friction load.

Changing the frequency and amplitude of sinusoidal driving in the settings of exposure control conditions, and performing exposure at the peak of the amplitude of the sinusoidal driving will be explained with reference to FIGS. 6B and 6C.

Figure 6B:
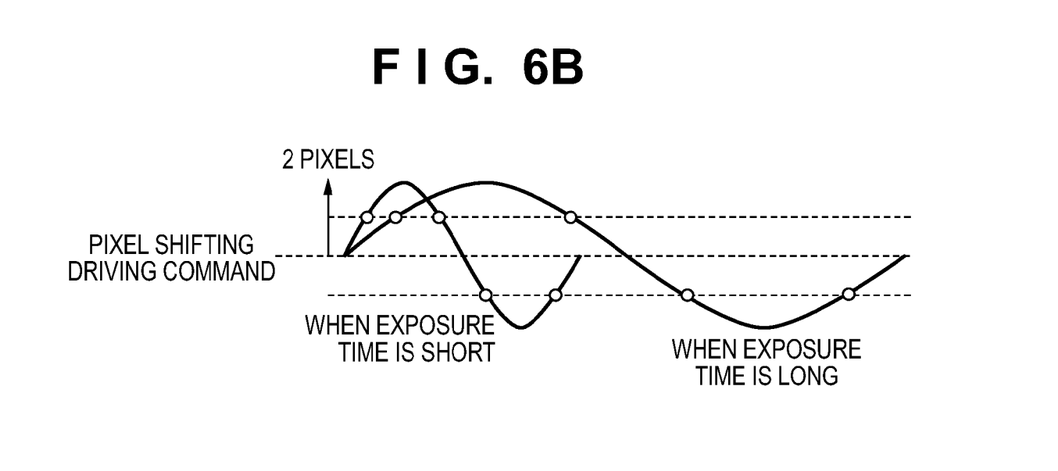
FIG. 6B is a view showing the driving command for pixel shifting according to the embodiment.
Figure 6C:
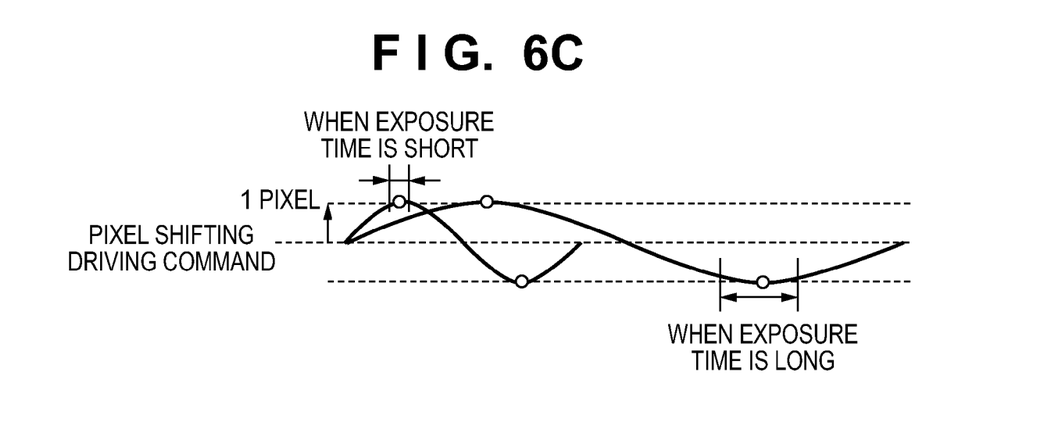
FIG. 6C is a view showing the driving command for pixel shifting according to the embodiment.

Each of FIGS. 6B and 6C shows one of the first and second driving commands. In either case, the same operation is performed. FIG. 6B shows an example of a pixel shifting driving command when an exposure time is different in the settings of the exposure control conditions. When the exposure time is long, the frequency of the sinusoidal wave of the driving command is lower than when the exposure time is short. This can reduce a blur by sinusoidal driving during exposure when the exposure time is long. That is, when the exposure time is long, it is possible to reduce a blur during exposure by decreasing the driving speed of the lens (the gradient of a change in lens driving position at an exposure timing) as much as possible. Furthermore, as shown in FIG. 6C, it is possible to further reduce a blur during exposure by changing the driving frequency according to the exposure time with an amplitude of one pixel which is desirable to perform pixel shifting, and performing exposure at the peak of the sinusoidal wave where a change in moving speed of the image stabilization lens is 0.

Figure 6D:
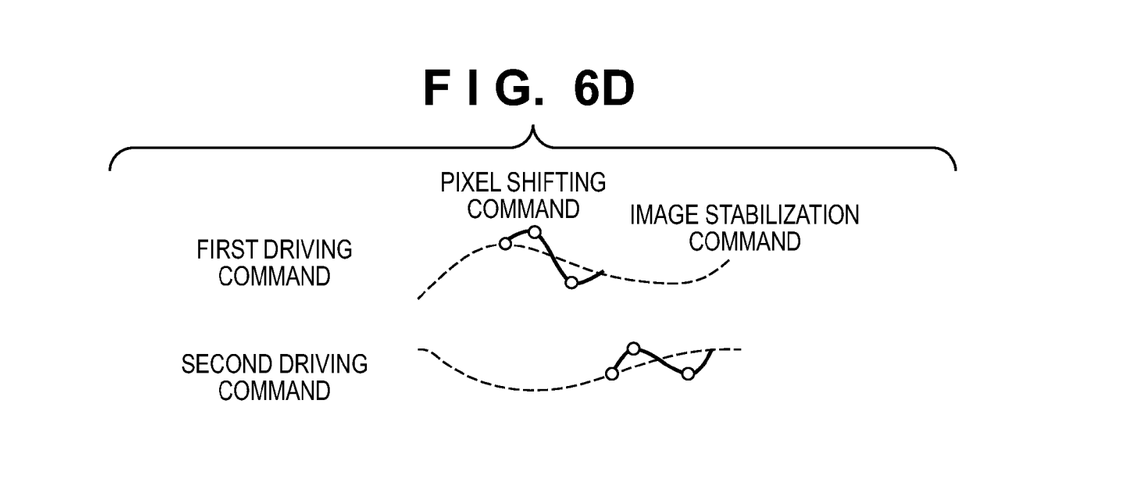
FIG. 6D is a view showing the driving commands for pixel shifting according to the embodiment.

FIG. 6D is a view showing examples of a driving waveform when pixel shifting is performed while executing image stabilization described in step S127 of FIG. 5C. In this way, it is possible to perform pixel shifting while executing image stabilization by adding a driving signal for pixel shifting to the image stabilization command signal to perform driving, and performing exposure when a shift by a target pixel shift amount occurs.

Figure 6E:
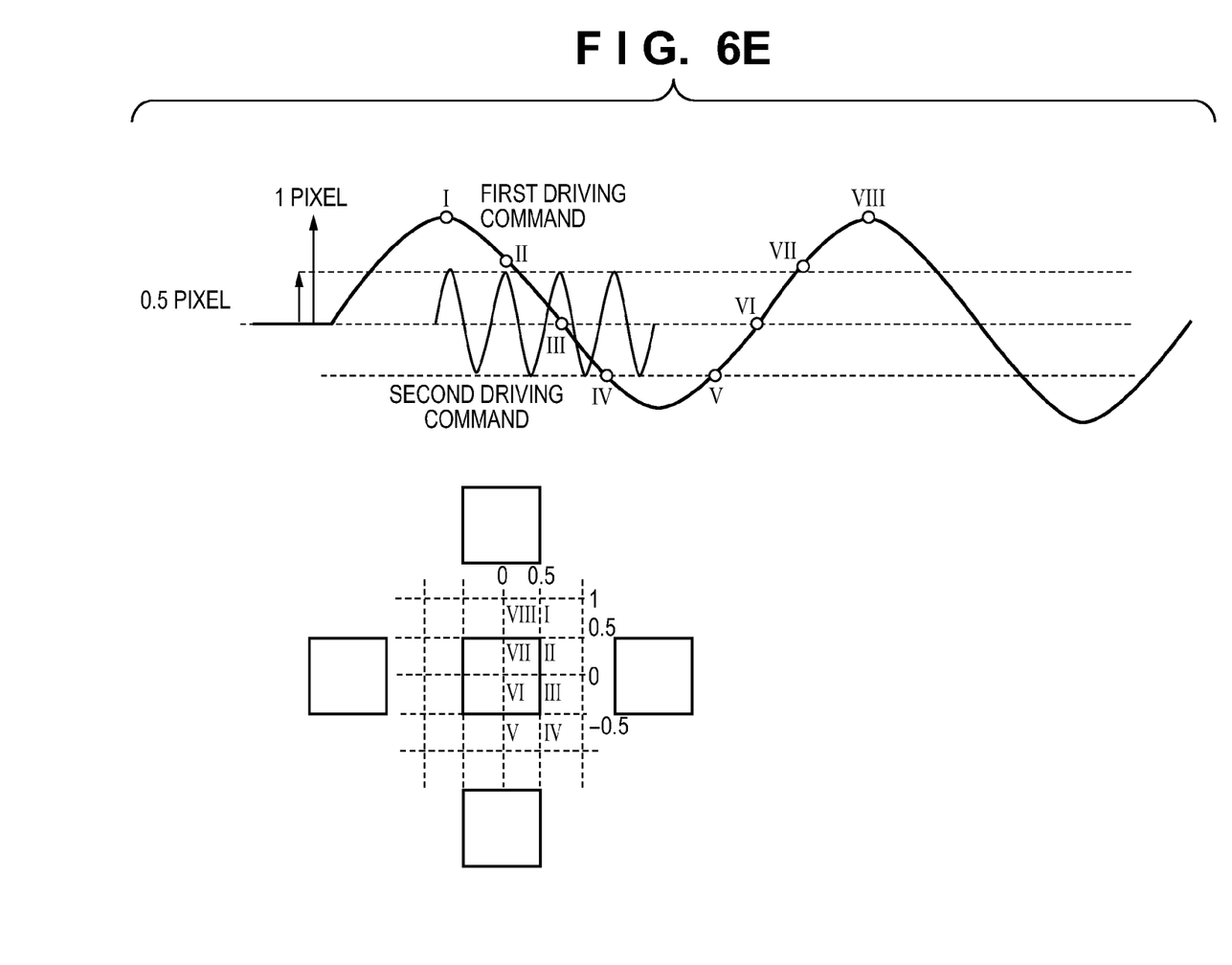
FIG. 6E is a view showing the driving commands for pixel shifting according to the embodiment.

FIG. 6E is a view showing a case in which pixel shifting is performed by 0.5 pixel by simultaneously sending first and second driving commands. As shown in FIG. 6E, the first and second driving commands of different amplitudes and frequencies are sent, and exposure timings are set to positions I to VIII, thereby allowing obtaining of images by pixel shifting by 0.5 pixel. This can shorten the image obtaining time for pixel shifting as compared with a case in which first driving and second driving are separately performed, as shown in FIG. 6A.

With the above-described processing, it is possible to prevent, in image stabilization lens driving for pixel shifting, variations in shifting amount from occurring or a pixel shifting amount from shifting from a target shifting amount due to the influence of, for example, friction in microdriving, and to reduce the lens driving time for pixel shifting. This allows shooting of a high-resolution image with high accuracy.

In this embodiment, pixel shifting is performed by driving the image stabilization lens as an image stabilization member. However, pixel shifting may be performed by driving the image sensor as an image stabilization member.

Although the image stabilization apparatus according to this embodiment is incorporated in a digital camera as an image capturing apparatus in the above description, it may be incorporated in a digital video camera. In addition, an optical device such as a lens barrel used for a monitoring camera and cellular terminal as well as a digital camera may be used. The image stabilization apparatus can also be used as the image stabilization apparatus of an interchangeable lens for a single-lens reflex camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-244809, filed Nov. 6, 2012, which is hereby incorporated by reference herein in its entirety.

What is claimed is:

1. An image stabilization apparatus mounted on an image capturing apparatus, comprising:
    a correction member capable of changing a position of an image on an image sensing plane by moving in a direction different from an optical axis;
    a position detection unit configured to detect a position of said correction member;
    a control unit configured to control a pixel shifting driving of said correction member by a first waveform of a sinusoid which has an amplitude larger than a pixel pitch of an image sensor; and
    an exposure control unit configured to control exposure of the image sensor,
    wherein, after setting pixel shifting driving conditions, said control unit adds the first waveform to a second waveform of a sinusoid which is used to perform an image stabilization driving of said correction member when a predetermined position shift amount has been detected, and
    wherein said exposure control unit performs the exposure when the position of said correction member detected by said position detection unit moves by the pixel pitch.

2. The apparatus according to claim 1,
    wherein said control unit drives said correction member in a first direction and a second direction perpendicular to the first direction, and also drives said correction member in the second direction after driving said correction member in the first direction.

3. The apparatus according to claim 1,
    wherein if an amount of a shake of the image capturing apparatus is smaller than a predetermined value, said control unit sets a mode in which a plurality of images are obtained while moving said correction member by a predetermined amount in accordance with a pixel.

4. The apparatus according to claim 1,
    wherein said control unit changes a frequency and amplitude of a signal for sinusoidally driving said correction member in accordance with an exposure control condition of the image sensor.

5. The apparatus according to claim 1,
    wherein said correction member reduces an image blur on the image sensing plane by moving in the direction different from the optical axis based on a shake.

6. A control method for an image stabilization apparatus which is mounted on an image capturing apparatus, and includes a correction member capable of changing a position of an image on an image sensing plane by moving in a direction different from an optical axis, the method comprising:
    detecting a position of the correction member;
    controlling a pixel shifting driving of the correction member by a first wave form of a sinusoid which has an amplitude larger than a pixel pitch of an image sensor; and
    controlling exposure of the image sensor,
    wherein, after setting pixel shifting driving conditions, in the controlling the pixel shifting, the first waveform is added to a second waveform of a sinusoid which is used to perform an image stabilization driving of the correction member when a predetermined position shift amount has been detected, and
    wherein in the controlling exposure, the exposure is performed when the position of the correction member detected in the detecting moves by the pixel pitch.

* * * * *